United States Patent

Nakamura et al.

[15] 3,655,988

[45] Apr. 11, 1972

[54] NEGATIVE RESISTANCE LIGHT EMITTING SWITCHING DEVICES

[72] Inventors: Tutomu Nakamura, Akashi-shi; Saburo Matsuda, Nara-shi; Yoichi Ito, Osaka, all of Japan

[73] Assignee: Sharp Kabushiki Kaisha, Osaka, Japan

[22] Filed: Dec. 10, 1969

[21] Appl. No.: 883,776

[30] Foreign Application Priority Data

Dec. 11, 1968 Japan....................................43/90657
Dec. 11, 1968 Japan....................................43/90659

[52] U.S. Cl...........................250/209, 250/211 J, 250/213 A, 307/311, 307/324, 328/2

[51] Int. Cl.......................G01j 5/00, H01j 31/50, H03k 3/42

[58] Field of Search...........328/2; 250/213 A, 211 J, 217 SS, 250/209, 213 R; 307/311, 324

[56] References Cited

UNITED STATES PATENTS

| | | | |
|---|---|---|---|
| 3,443,166 | 5/1969 | Ing, Jr. et al. | 307/311 X |
| 3,560,750 | 2/1971 | Nagata | 250/213 R |

*Primary Examiner*—James W. Lawrence
*Assistant Examiner*—T. N. Grigsby
*Attorney*—Flehr, Hohbach, Test, Albritton & Herbert

[57] ABSTRACT

A switching device includes a negative resistance light emitting two-terminal switching semiconductor element connected in series with a load and a direct current power source. Control means control the switching of the light emission of the device and photoelectric converter means obtain an output indicative of the condition of the device. The semiconductor element is a four layer device with the center junction normally reverse biased.

10 Claims, 23 Drawing Figures

INVENTORS
Tutomu Nakamura
Saburo Matsuda
Yoichi Ito
BY
Flehr, Hohbach, Test
Albritton & Herbert
ATTORNEYS INVENTORS
Tutomu Nakamura
Saburo Matsuda
Yoichi Ito
BY
Flehr, Hohbach, Test,
Albritton & Herbert
ATTORNEYS INVENTORS
Tutomu Nakamura
Saburo Matsuda
Yoichi Ito
BY Flehr, Hohbach, Test, Albritton & Herbert
ATTORNEYS INVENTORS
Tutomu Nakamura
Saburo Matsuda
Yoichi Ito
BY
Flehr, Hohbach, Test, Albritton & Herbert
ATTORNEYS INVENTORS
Tutomu Nakamura
Saburo Matsuda
Yoichi Ito
BY
Flehr, Hohbach, Test,
Albritton & Herbert
ATTORNEYS

NEGATIVE RESISTANCE LIGHT EMITTING SWITCHING DEVICES

BACKGROUND OF THE INVENTION

This invention relates to a novel switching device for use in opto-electronics, and more particularly a device including a diode which has a current control type negative resistance and light emission capability which increases with the current intensity (hereinafter referred to as GND).

Electro-photo conversion circuits have been already developed including light emitting devices such as diodes light coupled to photoelectric converters such as photo-diodes. Such circuits have required switching and amplifying devices for the control of light emittance. Thus, such known opto-electronics devices with their essential multitude of elements are relatively highly complex. This constitutes a common limitation of such devices.

OBJECTS AND SUMMARY OF THE INVENTION

It is a primary object of the present invention to provide a switching device of marked simplicity in circuit formation whose capability was hitherto either unattainable or could only be matched by far more complicated devices.

Switching device, as used herein, includes a variety of devices representing such circuits as NOT, NOR, NAND and other logical circuits, flip-flop circuits and combinations thereof, to say nothing of devices maintaining on-off conditions.

It is another object of the present invention to provide a switching device which responds to a continuously changing series of light input or one-shot trigger light input or, alternatively, to a continuously changing series of electrical input or one-shot trigger electrical input.

It is still another object of the present invention to provide a switching device or a group of devices of outstanding simplicity for simultaneous on-off control of photo and electrical outputs.

It is still a further object of the present invention to provide a novel opto-electronics device of extremely high light emitting efficiency combining in it also amplifying and switching functions.

Another object of the present invention is to provide a novel opto-electronics device of high light emitting luminous efficiency which is stable in its operation at room temperature.

Still another object of the present invention is to provide a switching device which responds so quickly as on the order of $10^{-7}$ sec. in terms of time lag.

In accordance with the above objects the switching device comprises a circuit including a two-terminal semiconductor switching diode element having negative resistance characteristics and light emission which varies with current flowing therethrough connected in series with an impedance, a power source and control means for switching the operating condition of said semiconductor diode, and means for obtaining an output signal from said circuit.

BRIEF DESCRIPTION OF THE DRAWINGS

FIGS. 16 and 17 are circuit diagrams showing applications of the circuit shown in FIG. 1.

DESCRIPTION OF PREFERRED EMBODIMENT

Figures 1, 2, 3, 4:
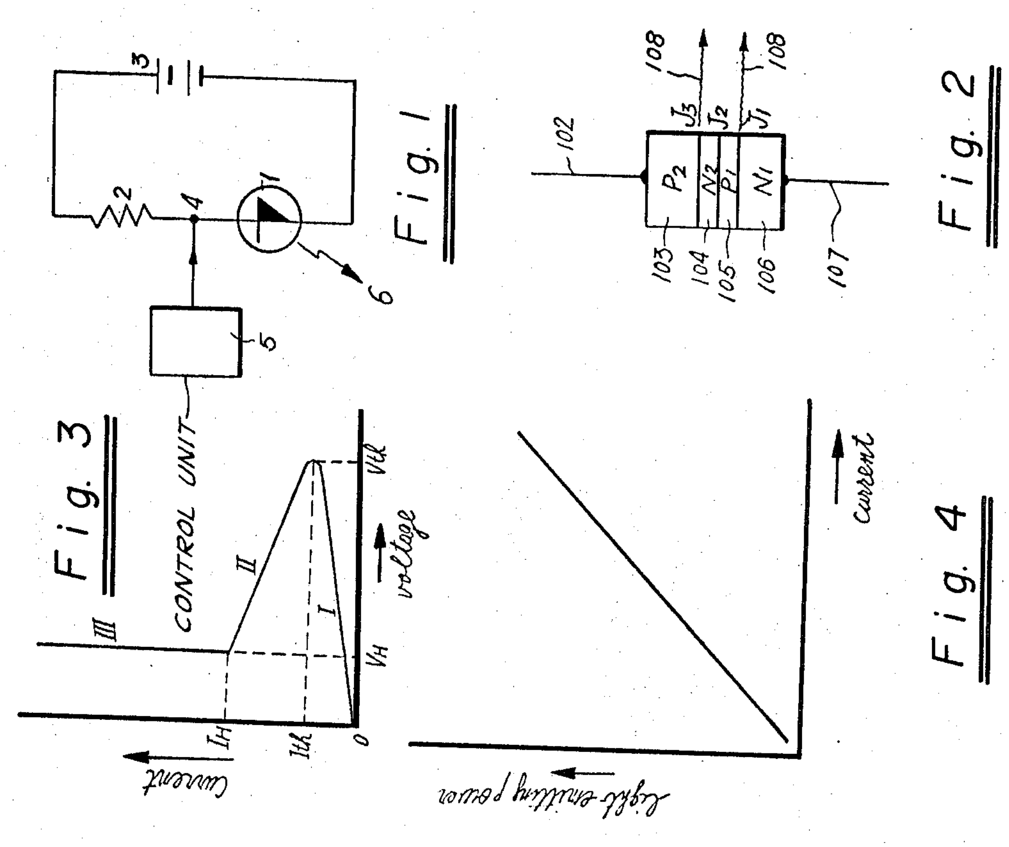
FIG. 1 is a circuit diagram showing a switching device as a basic embodiment of the present invention.
FIG. 2 is a sketch showing the inside structure of the GND element incorporated in the circuit of FIG. 1.
FIG. 3 is a characteristic curve showing the voltage-current characteristic of GND illustrated in FIG. 2.
FIG. 4 is a characteristic curve showing the current-light output characteristic of GND illustrated in FIG. 2.

The switching device of FIG. 1 as a basic embodiment of the present invention is fabricated from a two-terminal semiconductor unit 1 having current controlling negative resistivity which emits light substantially proportional to input current, an impedance unit 2 connected in series with the aforementioned semiconductor unit 1 acting as a load thereon, a direct current power source 3 which supplies forward current to the semiconductor unit, control means 5 for "changing" the mode of performance of the said semiconductor and means 6 for taking out output light or output electric signal or both from the above mentioned semiconductor unit or the series circuit including it.

The negative resistance light emitting diode GND 1 which, among others, forms the basis for the present invention is a PNPN element including four layers with GaAs as principal ingredient, as illustrated in FIG. 2. The element is composed of $N_1$, 106 as the base region and successive regions mounted thereon, namely $P_1$ region 105, $N_2$ region 104 and $P_2$ region 103. Between the successive regions are formed boundaries or junctions $J_1$, $J_2$ and $J_3$. Base region $N_1$, 106 and $P_2$ region 103 are provided with metallic electrodes 107 and 102. The diode with its structure exhibits a current-control type negative resistance characteristic and has a high luminous (light emitting) efficiency. FIG. 3 presents the voltage current characteristic of this type of PNPN diode and FIG. 4 the current-light output characteristic thereof.

When the $P_2$ region is biased positive and the $N_1$ region negative, boundaries $J_3$ and $J_1$ are biased forward but the intermediate boundary $J_2$ is biased inversely and with low applied voltage the current is almost completely blocked. The diode then behaves as suggested by domain I of the characteristic curve of FIG. 3. As the bias voltage is increased, part of the electrons injected from $N_1$ region reach boundary $J_3$, thus facilitating the injection of holes from $P_2$ region, while the holes injected from $P_2$ region reach boundary $J_1$ to enhance injection of electrons from $N_1$ region and thus progressively larger numbers of electrons and holes are injected into base regions $P_1$ and $N_2$. This gives rise to the phenomenon called electron multiplication.

Meanwhile, at boundary $J_2$ where a high intensity electric field is formed because of the inverse bias voltage applied, the condition gives rise to "break down," this, in turn, results in electron multiplication due to electron avalanche. As a result of such mutual "action," a multitude of electrons are accumulated in $N_2$ region and a multitude of holes in $P_1$ region and this condition gives rise to inclination toward forward biasing of boundary $J_2$. The potential difference at boundary $J_2$ decreases. This results in decrease of the potential difference between the two terminals. Domain II of the curve of FIG. 3 shows this operation. Finally, the electric potential at boundary $J_2$ comes to the state of equilibrium, this virtually providing the condition of free conductivity and permitting flow of high current. Domain III of the curve of FIG. 3 shows this operation.

The described structure allows recombination of the electrons injected from $N_1$ region 106 with the holes injected from $P_2$ region 103 to take place at boundaries $J_1$ and $J_3$ and light is efficiently emitted.

As may be seen from FIG. 4, the light output of GND 1 is roughly proportionate to the input current intensity, this being true in all of domains I, II and III of FIG. 3. With current intensity as "I" and light output as "P," this relationship could be approximated by the formula $$P \propto I^n$$

where "$n$" is a constant characteristic of the given diode.

Described below is an example of the manufacturing method for the above mentioned GND. With Si alone as impurity, it is possible to have these PNP regions formed in one process on an N-type substrate by a liquid phase growth process. Atoms of Group IV such as Si, Ge, Sn are impurities which can act on GaAs as donor and also as acceptor, and hence may be called bi-functional. Such IV-group atoms act as donors when they replace Ga atom, while they are acceptors when As atom is replaced. As a Si doped GaAs epitaxial layer is allowed to grow by the liquid phase growth process, n-type GaAs grows at relatively high temperatures but at lower temperatures, inversion from n- to p-type takes place in the course of growth. This n -- p inversion temperature depends on such factors as the crystallization orientation of GaAs base plate dopant etc., but by far the most important factor is the cooling rate in the course of growth. This knowledge may be utilized for preparation of an element of the desired structure. So, first a p-type layer or region may be allowed to grow under cooling; then the cooling rate may be enhanced to induce growth of n-type layer and then inversion may be allowed to take place for resultant growth of p-type layer. Thus, three layers of p–n–p types can be grown by mere control of the cooling rate. An Si doped GaAs negative resistance electric field light emitting diode GND thus prepared has a high quantum yield in light emittance of ⅔% which is about ten times that of a conventional diode and hence can function at room temperature.

The threshold voltage, $V_{th}$, threshold current, $i_{th}$, holding voltage, $V_h$, and holding amperage, $I_h$, of the diode thus prepared are as follows:

| | |
|---|---|
| $V_{th}$= 2 - 25 volts | $I_{th}$ = 0.1 - 20 mA |
| $V_h$ = 1.3 - 1.4 volts | $I_h$ = 1 - 70 mA |

The response speed of the GND diode is determined by the length of time required for the electrons and holes to pass through what represents the base regions of PNP and NPN transistors comprising the PNPN four layer (region) structure. Since the layers (regions) representing the base regions, namely $P_1$ and $N_2$ regions are both as thin as several microns to 10-odd microns, the speed of response (turn-on time) is normally 1–5 $\mu$ sec., and it is even possible to get one speed of response (turn-on time) of 0.1 $\mu$ sec.

Figure 5:
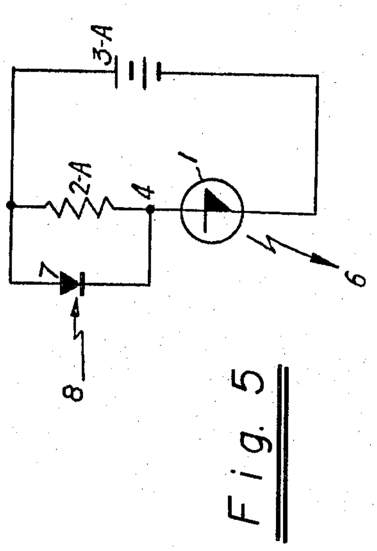
FIGS. 5 through 10 show various variations of the circuit shown in FIG. 1.
Figure 11:
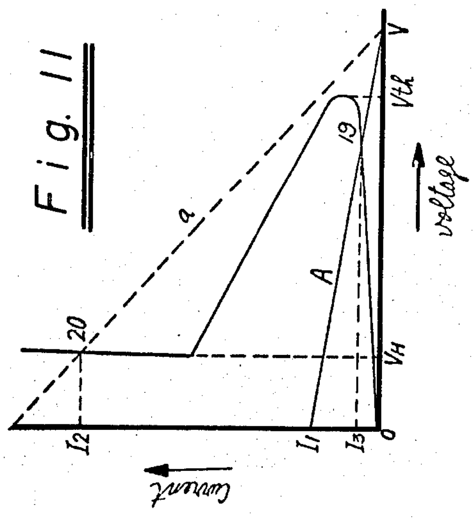
FIGS. 11 through 13 are performance curves for the circuits of FIGS. 5–10.

The circuit shown in FIG. 5 contains as control means 5 the parallel resistance 2A and photo-sensitive diode 7. As seen from the curve of FIG. 11, the voltage of power source 3A is set higher than the threshold voltage, $V_{th}$, of the GND diode, while the resistance value of resistance 2A is chosen so that, with diode 7 not exposed to input light 8, the load characteristic curve runs as indicated by line A, i.e., GND diode operates in domain I. In this case the primary operating point is represented by the intersection point 19. The current intensity at this point is $I_3$. As diode 7 is exposed to input light, it gives rise to phenomenon identical with that resulting from lowering of the resistivity value of resistance 2A and the load characteristic curve is now shifted from line A to say line a, with a resultant shift of the operating point from 19 to 20. Under this condition the current is high and the GND diode exhibits a high light emittance. With this circuit the increase of light input to the diode 7 turns on light output 6, while light output is turned off on decrease of light input 8. This circuit can be utilized as a switching circuit for light.

Figure 6:
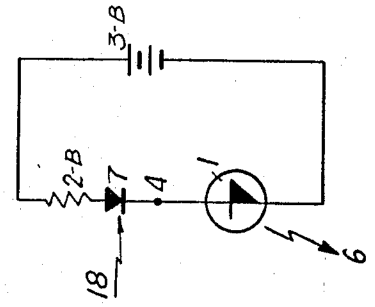
Figure 12:
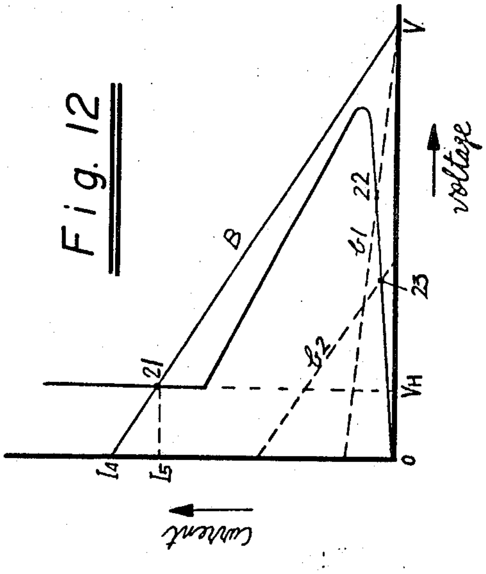

FIG. 6 presents a variation of the circuit shown in FIG. 5 with diode 7 connected in series with resistance 2B. Referring to the load characteristic curve for the GND diode, the voltage of the power source, V, is set as indicated on FIG. 12 by line B when diode 7 is in the state of low resistance. The operating point under this condition is indicated by point 21 in the domain III and light output 6 is "on." When input light 18 decreases, the load's resistance increases substantially and the load characteristic curve is shifted to line $b_1$ with a resultant shift of the operating point to 22, domain I. With this circuit light output is turned on with an increase of input light, while it is turned off with a decrease of input light, and hence this circuit can be utilized as optical logical circuit.

Figure 7:
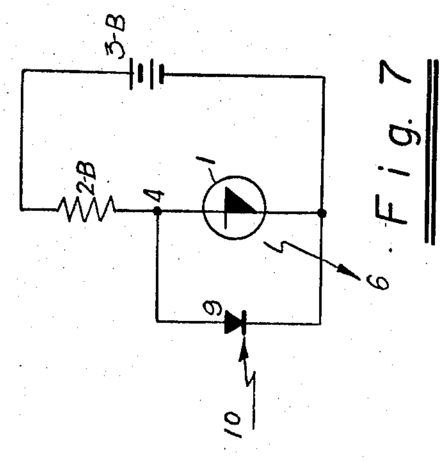
Figure 8:
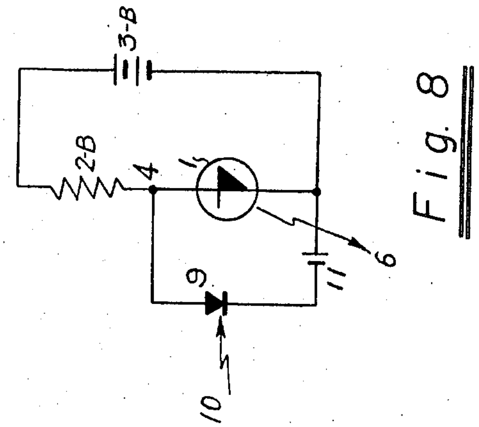

The circuit shown in FIG. 7 has a control means 5 a photosensitive diode 9 connected in forward sense in parallel with GND diode 1. Referring to the characteristic curve of GND diode, the voltage, V, of power source 3B and the resistance value of resistance 2B are chosen as indicated on FIG. 12. With diode 9 scarcely conductive, the load characteristic curve is to stand as indicated, for instance, by line B and operating point 21 in domain III. With an increase of input light 10 applied to diode 9, the operating point shifts readily to domain I and output light is turned off, and this circuit is useful as an optical logical circuit. The circuit shown in FIG. 8 is a variation of that in FIG. 7, provided with a second direct current power source 11 in the loop formed by the GND diode 1 and diode 9. Its polarity is such that the current supplied by this source is in the opposite sense to that from the first power source 3B.

When the input light 10 is weak and diode 9 is nonconductive, the second power source 11 is totally inactive. As input light 10 is applied to diode 9, the small loop is supplied with second current, $i_2$, from the second power source 11. The stronger this second current, $i_2$, is, the closer approaches the load characteristic curve to the origin of coordinates, as indicated by line $b_2$, and thus the range of operation can easily be extended to reach domain I. The circuits shown in FIGS. 5–8, each thereof, represents a switching device which operates in response to continuously increasing or decreasing light input to produce definitely on-off controlled light output or, if need be, electric output.

Figure 9:
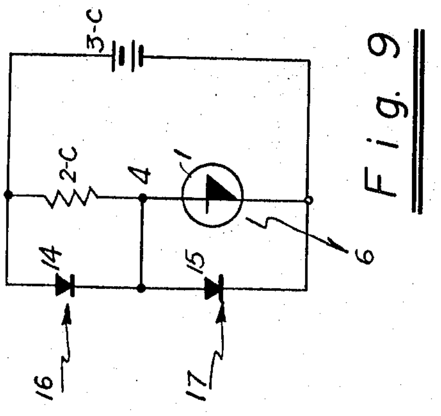

The circuit shown in FIG. 9 has as control means photo diode 14 which responds to set trigger light 16 connected in parallel with resistance 2C and another photo diode 15 which responds to reset trigger light in parallel with the GND diode 1. The photo diodes 14 and 15 are connected in the forward sense. Referring to the characteristic curve of GND diode 1, the voltage of power source 3C is set at $V_1$ higher than $V_{th}$, and the resistance value of resistance 2C is set so that when both photo diodes 14 and 15 are conductive, the load characteristic curve is indicated by line C on FIG. 13. There are two stable points, namely 251 and 24. When, with the operating point at 251 in domain I, photo diode 14 receives input light 16, it results in shifting of the operating point past threshold voltage, $V_{th}$, into domain III to stable operating point 24. This state is maintained even after the setting input light 16 has gone off. When resetting input light 17 is applied to photo diode 15, however, the operating point is shifted back, past holding voltage, $V_h$, to domain I, and remains there, the stable point of operation 251 is maintained even after resetting input light 17 is turned off. This circuit represents a kind of flip-flop circuit whose switching operation is synchronized with trigger light and it can be utilized as a memory unit.

Figure 10:
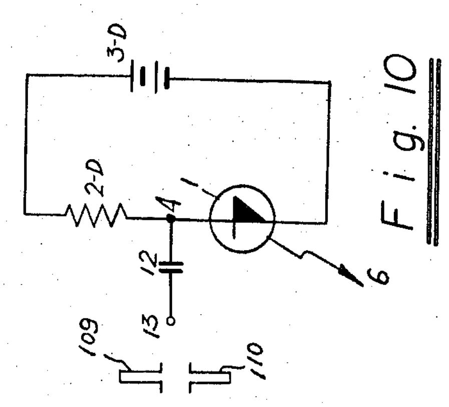

With the circuit of FIG. 10, control is accomplished by application of an electrical trigger signal to terminal 13 at terminal 4 and condenser 12. Referring to the characteristic curve of the GND diode, the voltage of power source 3D is set either at $V_1$ above $V_{th}$ or $V_2$ below $V_{th}$ and the resistivity value of resistance 2D is set so that the load characteristic curve stands as indicated, for instance by lines C or D, FIG. 13. There are two points of stabilization, 251 or 252 and 24. When the operating point is in domain I at 251 or 252, positive trigger signal 109 of peak value high enough to displace the operating point beyond threshold voltage, $V_{th}$, the operating point shifts to another point of stabilization, 24 in domain III, whereas on application of negative trigger signal 110 of peak value high enough to displace the operating point beyond holding voltage, $V_h$, the operating point is shifted back to domain I. The circuit is so designed that the point of operation is held stable at either point of stabilization even after discontinued application of trigger signal. This circuit represents a kind of flip-flop circuit whose switching operation is synchronized with electric signal, and hence can be utilized as a memory unit.

Figures 14, 16, 18:
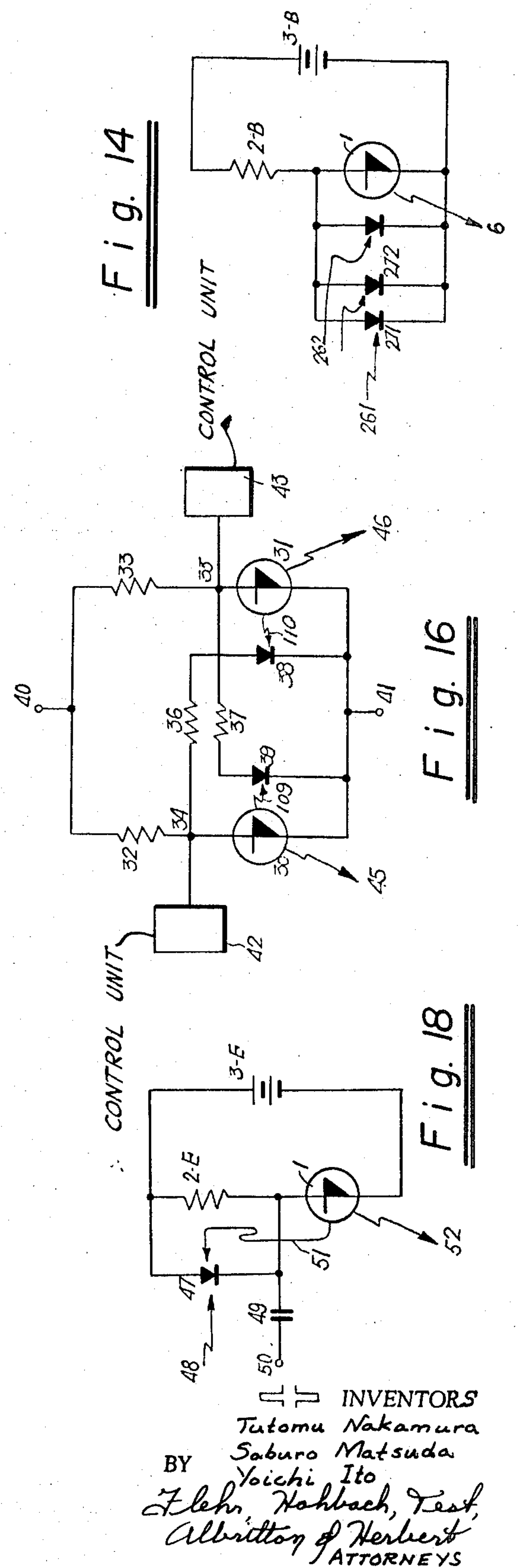
FIG. 18 is a circuit diagram showing another variation of the circuit of FIG. 1.

The circuit shown in FIG. 14 represents an application of the circuit of FIG. 7, provided with a plurality of photo diodes 271, 272 . . . . connected in parallel, each of which is provided with a means for supplying input light 261, 262 . . . . The voltage of power source 3B and resistivity value of resistance 2B are selected in the same manner as described for the circuit of FIG. 7. With this circuit, the GND diode has its operating point in domain I when input light is applied to any one of the plurality of diodes 271, 272 . . . . , and the operating point is in domain III only when none of the diodes receives input light. This circuit is useful as optical NOR logical circuit. Circuits having the same function as the above mentioned circuit can be obtained by providing the circuit of FIG. 6 or FIG. 8 with a plurality of photo diodes connected in parallel with the GND diode 1. It may be easily understood that an optical OR logical circuit could be developed by replacing photo diode 7 of the circuit of FIG. 5 with a plurality of photo diodes.

Figures 13, 15, 17:
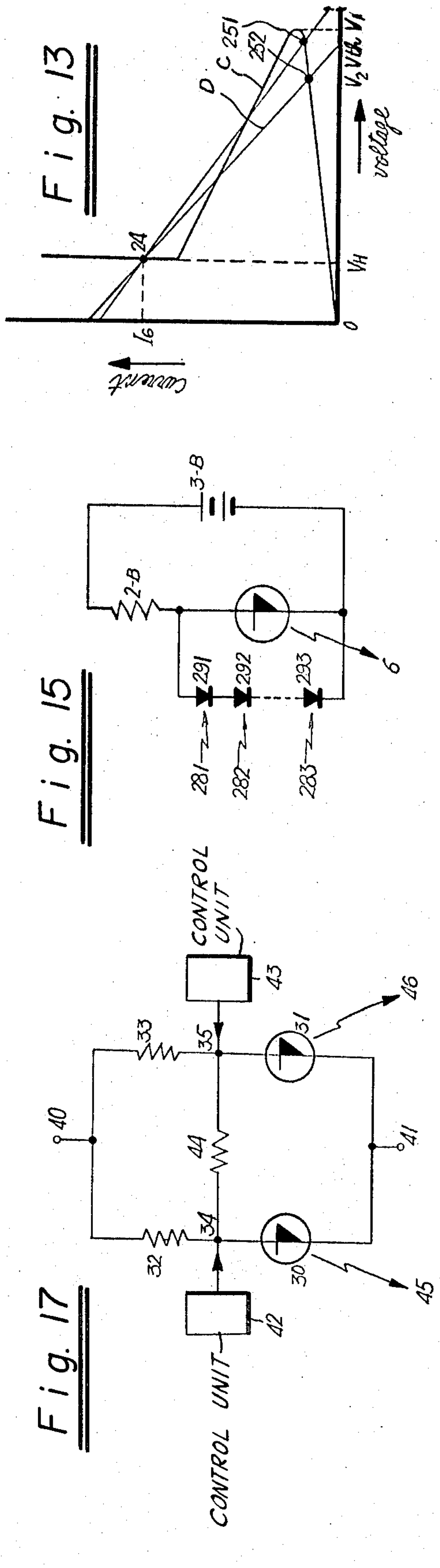
FIGS. 14 and 15 are circuit diagrams showing applications of the circuit shown in FIG. 7.
FIGS. 16 and 17 are circuit diagrams showing applications of the circuit shown in FIG. 1. shown in FIG. 7.

The circuit shown in FIG. 15 is another application of the circuit of FIG. 7, provided with a plurality of photo diodes connected in series 291, 292 . . . . 293, each of which is provided with one means for supplying input light 281, 282 . . . . 283. The voltage of power source 3B and resistivity value of resistance 2B for GND diode 1 are to be chosen in essentially the same manner as described for the circuit of FIG. 7 or FIG. 14. With this circuit, the GND diode 1 has its operating point in domain I only when input light is applied to all of the diodes 291, 292 . . . . 293 and the operating point is in domain III when any one of the diodes does not receive input light. This circuit is, therefore, useful as an optical NAND logical circuit.

Similarly, the circuit of FIG. 6 or FIG. 8 can be converted into a NAND logical circuit by providing a plurality of photo diodes connected in series. It may be easily understood that an AND logical circuit could be developed by applying the same theory to the circuit of FIG. 5.

The circuit shown in FIG. 16 represents a combination by optical means of two sets of the basic circuit illustrated in FIG. 1, useful as a flip-flop circuit. In this circuit GND 30, 31, load resistances 32, 33 connected in series therewith, output means 45, 46, and control means 42, 43 correspond to GND 1, load resistance 2, output means 6 and control means 5 in FIG. 1. Terminals 40, 41 are connected to the direct current power source. Photo diode 38 is connected by resistance 36 to point 34 in the first circuit. This photo diode receives the light output from the second circuit. Similarly, photo diode 39 is connected by resistance 37 to point 35 in the second circuit. This photo diode receives the light output from the first circuit. Light coupling means 109, 110 may be suitable photo-coupler such as optical fibers.

When two sets of the circuit of the type shown in either FIG. 7 or FIG. 8 are to be used in combination, photo diode 9 could be utilized as photo diode 38 or 39 of the above mentioned combined circuit. The control means 42, 43 may be used either as optical or electric means such as those shown in FIGS. 5 through 10. It is also possible to use a second power source like the power source 11 in FIG. 8.

When GND 30 has its operating point in domain III and is emitting light, photo-transistor 39 is kept conductive and GND 31 of the second circuit has its operating point in domain I, light emitting output is "off." When a positive trigger signal is applied to point 35 of the second circuit or the resistance value of load resistance 33 is lowered to cause shifting of the operating point of GND 31 from domain I to domain III, photo diode 38 is made conductive and GND 30 of the first circuit has its operating point shifted to domain I and this second stable state is maintained. This circuit represents a set-reset flip-flop circuit when control means 42, 43 are used as setting input means and resetting input means respectively.

The circuit shown in FIG. 17 is another flip-flop circuit representing a combination of two sets of the basic circuit in FIG. 1 characterized by the connection between circuits made by an impedance. As the figure shows, GND 30, load resistance 32, output means 45 and control means 42 constitute the first circuit, while the second circuit is composed of GND 31, load resistance 33, output taking out means 46 and control means 43; these two circuits are connected by resistance 44. Terminals 40, 41 are connected to a direct current power source. When GND 31 of the second circuit has its operating point in domain I and is not emitting light, this may be assumed to represent a high resistance and then, assuming that the load resistance for GND 30 of the first circuit comprises resistance 32 connected in parallel with series-connected resistances 44, 33, it may be well understandable that the load characteristic curve will be as indicated by line B of FIG. 12. GND 30 of the first circuit then has its operating point in domain III and emits light intensively (first state of stabilization). When under this condition, control means 42 or 43 is actuated to have the operating point of GND 31 of the second circuit shifted to domain III or that of GND 30 of the first circuit shifted to domain I, the second state of stabilization is produced since in the first and second circuits are symmetrical with each other. In this second state of stabilization GND 31 is in the low impedance state and since the voltage level at connecting point 35 is low, it may well be understandable that the load characteristic curve will be as indicated by line $b_2$ of FIG. 12.

The circuit shown in FIG. 18 is still another variation of the basic circuit of FIG. 1 representing the addition of a new function to the circuit of FIG. 10. The voltage of power source 3E is set somewhat lower than threshold voltage, $V_{th}$, of GND 1, while the resistivity value of load resistance 2F is so set that the load characteristic curve is as indicated by line E of FIG. 19 when photo diode 47 connected in parallel therewith is nonconductive and as indicated by line *e* when said photo diode is conductive. Photo diode 47 is provided with means 51 for feeding back the light emitting output from GND 1 and also with means 48 for receiving input light from outside the circuit. Positive and negative electric pulse signals are applied to terminal 50 connected to this circuit over condenser 49.

Figure 19:
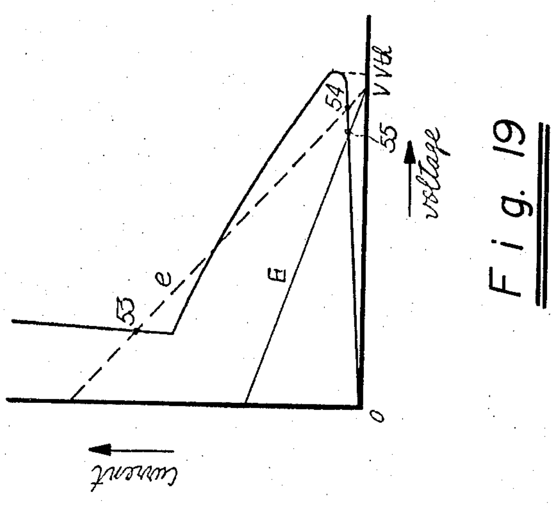
FIG. 19 are the performance curves for the circuit of FIG. 18.

When photo diode 47 is nonconductive, the operating point of GND 1 is marked by point 55 on the graph of FIG. 19. Arrival of input light then shifts the operating point from 55 to 54 but not into domain III. When under this condition a positive trigger signal is applied to terminal 50, however, the operating point is immediately shifted to point 54 in domain III and the photo diode receiving the light emitting output of GND 1 itself remains conductive. This state is maintained even after vanishing of input light and the operating point is shifted back to domain I only when a negative pulse is applied to terminal 50 or power source is turned off. Thus, this circuit operates accurately synchronized with electric trigger signal and hence can be utilized as a memory unit to memorize acceptance of the photo signal. The memorized information can be read from light output and this reading does not cause erasing of the memorized information.

Figure 20:
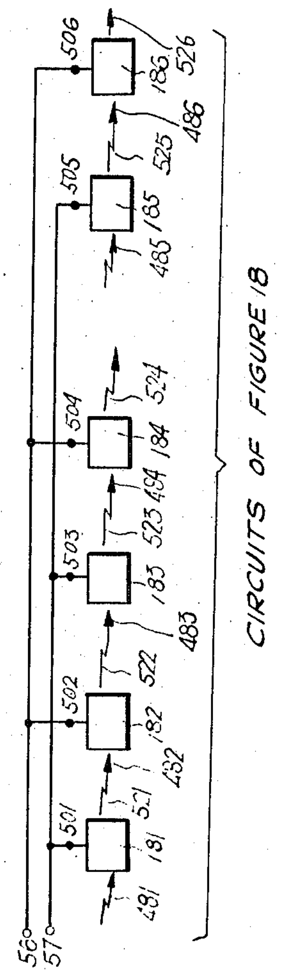
FIG. 20 is a block diagram showing an application of the circuit of FIG. 18.
Figure 21:
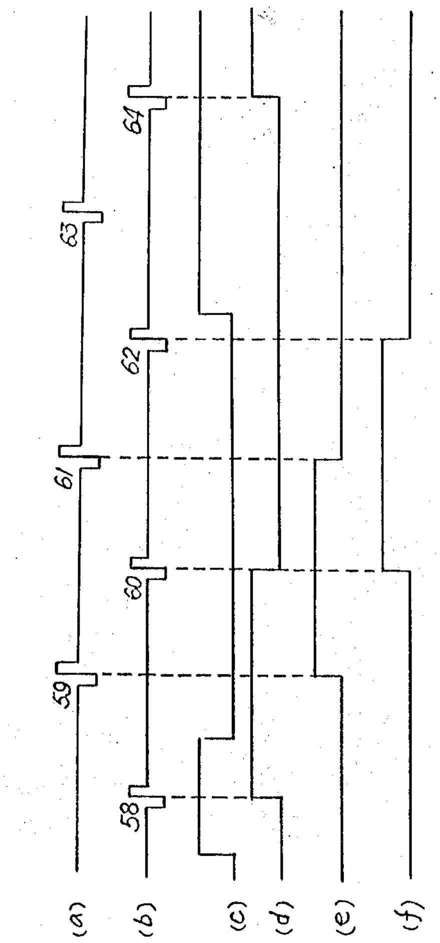
FIG. 21 is the timing chart for the circuit of FIG. 20.

FIG. 20 presents a shift transistor composed of a plurality of circuits of the type shown in FIG. 18. Each block 18, 182 . . . 186 on the figure is identical with the circuit shown in FIG. 18. Terminals 501, 502 . . . 506 correspond to terminal 50, light input means 481, 482 . . . 486 correspond to light input means 48, and light output means 521, 522 . . . 526 to light output means 52 of FIG. 18. Power source 3E may be used in common for all circuits. Terminals 501, 503 . . . 505 are connected in common to the second terminal 57, while terminals 502, 504 . . . 506 are connected in common to the first terminal 56. FIG. 21 is the timing chart for this circuit. FIG. 21(*a*) shows the waveform of the synchronous signal (clock pulse series) applied to terminal 56. FIG. 21(*b*) shows the waveform of the synchronous signal (clock pulse series) applied to terminal 57. Both electric signals include negative trigger signals followed by positive trigger signals. FIG. 21(*c*) shows an example of the light signal fed to the first light input means 481. On arrival of clock pulse following arrival of input light, the first circuit 181 is switched on and emits output light, FIG. 21(*d*). At this moment the second circuit 182 without arrival of clock pulse is not switched on even if it receives input light, not until arrival of clock pulse 59, FIG. 21(*e*). Thus, the comprising circuits are successively switched on and off synchronous with the clock pulse series and hence this circuit is useful as a " shift register."

With this circuit the clock pulses are arranged in two series and thus precluded is the danger of a single trigger input causing successive switching of a multitude of circuits even in the event of a long pulse interval. This arrangement also precludes the danger of interference even where the switch-over time is long compared with the pulse interval.

Figures 22, 23:
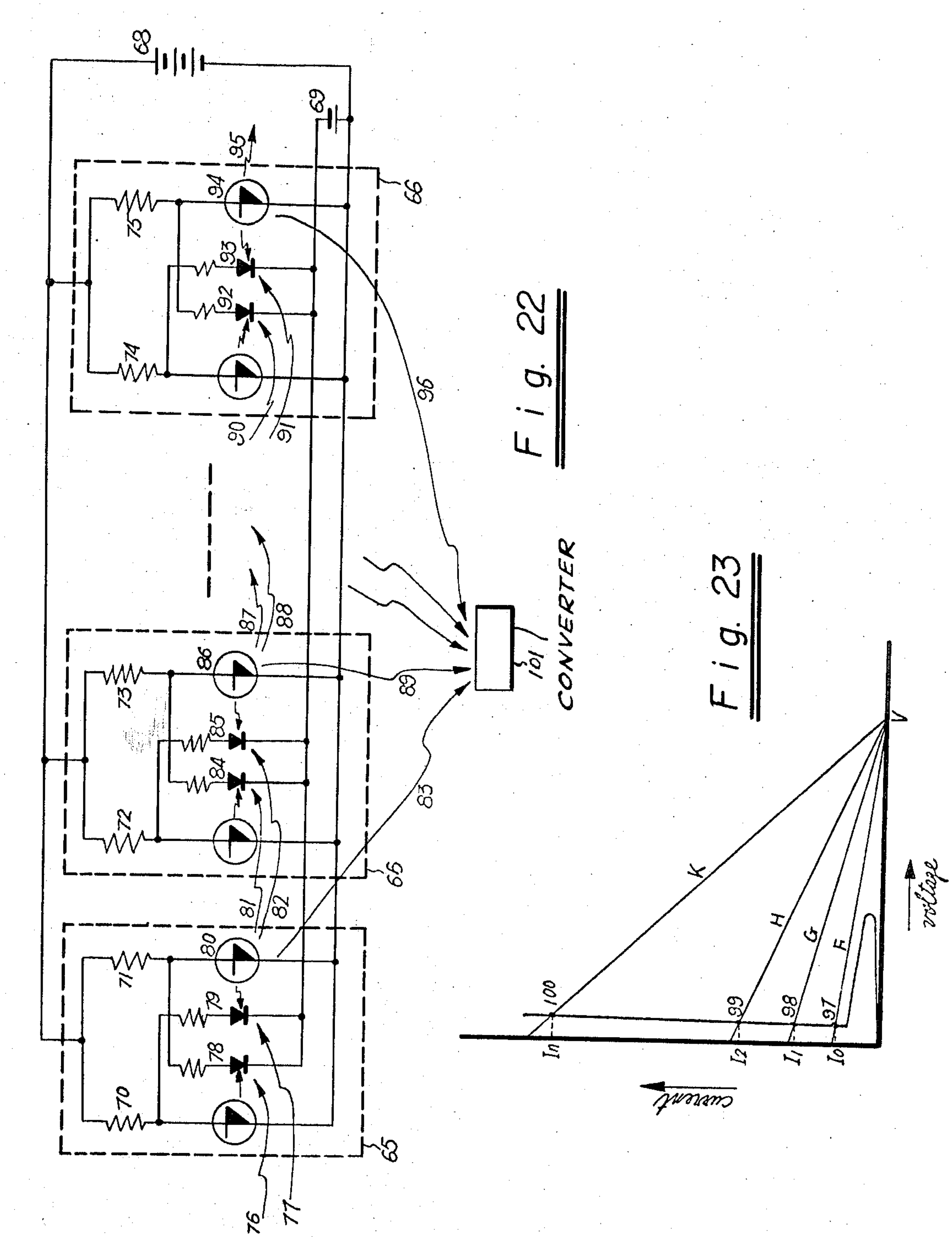
FIG. 22 is a circuit diagram showing an application of the circuit of FIG. 16.
FIG. 23 are the performance curves for the circuit of FIG. 21.

The circuit shown in FIG. 22 represents an application of the flip-flop circuit of FIG. 16, its function being the conversion of a digital "amount" fed in a counter into an optical analog. Each of the circuits 65, 66, 67 is a flip-flop circuit of the type shown in FIG. 16 and the resistivity value of load resistance is set as follows:

$$R = R70 = R71$$
$$R/2 = R72 = R73$$
$$R/2^2 = R72 = R73$$
$$R/2^{n-1} = R74 = R75$$

---

Counter input light signal is fed over feeding means 76, 77 into photo diodes 78, 79 of the first circuit 65 so as to have this flip-flop circuit 65 switched over.

The logical output from flip-flop circuit 65 is then fed by photo-sensitive means 84, 85 into photo diodes 84, 85 of flip-flop circuit 66 so as to have carry conveyed to the next circuit and as this procedure is repeated, *n*-digit counter (scale of two) is formed. The output from each flip-flop circuit is fed over light outlet means 83, 89 . . . 96 into photoelectric converter 101 and, if need be, can be utilized after conversion into electric signals.

FIG. 23 presents a chart indicating the operational characteristic of this circuit. The load characteristic curve for resistivity value "R" is indicated by line F and the current intensity of GND 80 is $I_0$ when the first flip-flop circuit 65 is switched on. Similarly, $I_1$ is the electric intensity of GND 86 when the second circuit is "on" and, as seen from the chart, $I_1 = 2\,I_0$. Similarly, the resistivity value of each load resistance is to be so adjusted that the relationships $I_2 = 2^2 I_0$, $I_3 = 2^3 I_0$ . . . are established. The characteristics of GND's for individual flip-flop circuits need not be identical.

We claim:

1. A switching device comprising a circuit including a two-terminal switching semiconductor element having first and second terminals and having a negative resistance characteristic with a high impedance state and a low impedance state and light emission which increases with increasing current flowing therethrough, said semiconductor element being of four-layer PNPN construction with three PN junctions, means for providing an impedance connected to said first terminal of such semiconductor element, means for forward biasing the two outer PN junctions of said three PN junctions and for backward biasing the intermediate PN junction, said biasing means connected between said impedance means and said second terminal of said element for forming a series circuit for supplying current to said semiconductor element in the forward sense, means for feeding a photo or electrical control pulse into said series circuit for switching said state of said semiconductor element, said control pulse having a sufficient magnitude to cause a large carrier accumulation cancelling said backward bias at said intermediate PN junction to switch said element from said high impedance state to said low impedance state, said element under said low impedance state emitting light in the vicinity of said forward biased two PN junctions, and means for obtaining an output indicative of the state of said semiconductor element from said circuit.

2. A device as in claim 1 where said negative resistance characteristic is of the current-control type and said impedance connected to said first terminal is a load resistor.

3. A switching device comprising a plurality of two terminal photo-sensitive elements forming a two terminal network and each thereof provided with independent means for feeding a photo signal into them so as to function as a two-value logical circuit each of said elements having first and second terminals and having a negative resistance characteristic with a high impedance state and a low impedance state and light emission which increases with increasing current flowing therethrough, means for providing an impedance connected to said first terminal of such semiconductor element, a direct current power source coupled between said impedance means and said second terminal and forming a series circuit for supplying current to said semiconductor element in the forward sense, control means coupled to said series circuit for switching the state of said semiconductor element said control means including a photo-sensitive element connected in the forward sense to said direct current power source and means for feeding a photo control signal into said photo-sensitive element for switching said state of said semiconductor element and means for obtaining an output from said circuit indicative of the state of said semiconductor elements.

4. A switching device fabricated from two switching devices comprising a circuit including a two terminal switching semiconductor element having first and second terminals and having a negative resistance characteristic with a high impedance state and a low impedance state and light emission which increases with increasing current flowing therethrough, means for providing an impedance connected to said first terminal of such semiconductor element, a direct current power source coupled between said impedance means and said second terminal and forming a series circuit for supplying current to said semiconductor element in the forward sense, control means coupled to said series circuit for switching the state of said semiconductor element said control means including a photo-sensitive element connected in the forward sense to said direct current power source and means for feeding a photo control signal into said photo-sensitive element for switching said state of said semiconductor element and means for obtaining an output from said circuit indicative of the state of said semiconductor elements and including means for having the light output from said semiconductor element belonging to the first switching device applied to said photo-sensitive element belonging to the second device and also with means for having the output light from said semiconductor element belonging to the second device applied to said photo-sensitive element belonging to the first device and thereby having the function of a flip-flop circuit.

5. A switching device fabricated from a plurality of sets of switching devices each comprising a circuit including a two terminal switching semiconductor element having first and second terminals and having a negative resistance characteristic with a high impedance state and a low impedance state and light emission which increases with increasing current flowing therethrough, means for providing an impedance connected to said first terminal of such semiconductor element, a direct current power source coupled between said impedance means and said second terminal and forming a series circuit for supplying current to said semiconductor element in the forward sense, control means coupled to said series circuit for switching the state of said semiconductor element said control means including a photo-sensitive element connected in the forward sense to said direct current power source and means for feeding a photo control signal into said photo-sensitive element for switching said state of said semiconductor element and means for obtaining an output from said circuit indicative of the state of said semiconductor elements each of said devices being connected to form a plurality of stages in which the impedance means in each set has a value in accordance with the weight of an analog signal to be converted, with means for feeding the output light from the set in one stage to said photo-sensitive elements of the set in the next stage and thus accomplishing multi-stage operation of said plural sets of switching devices by optical means and with means for collecting output lights from individual stages and thereby provide the function of digital to analog conversion.

6. A switching device comprising a circuit including a two terminal switching semiconductor element having first and second terminals and having a negative resistance characteristic with a high impedance state and a low impedance state and light emission which increases with increasing current flowing therethrough, means for providing an impedance connected to said first terminal of such semiconductor element, a direct current power source coupled between said impedance means and said second terminal and forming a series circuit for supplying current to said semiconductor element in the forward sense, control means coupled to said series circuit for switching the state of said semiconductor element said control means including a photo-sensitive element connected in the forward sense to said direct current power source and means for feeding a photo control signal into said photo-sensitive element for switching said state of said semiconductor element and means for obtaining an output from said circuit indicative of the state of said semiconductor elements and including means for having part of the output light from said semiconductor element applied to said photo-sensitive element.

7. A switching device composed of a plurality of sets of switching devices described in claim 6 connected to form a plurality of states and provided with means for having said output light applied to said photo control signal feeding means of the set in the next state and thereby affecting multi-stage connection of said plurality of sets of switching devices, means for mutual connection of the points where said semiconductor elements of sets in odd stages are connected with said means for providing an impedance, first means for generating periodic electric pulses capable of affecting a change of state of said semiconductor elements applied to such point of connection, means for mutual connection of the points where said semiconductor elements of sets in even stages are connected with means for providing an impedance, second means for generating periodic electric pulses differing in timing from said first pulse means and capable of affecting a change of state of said semiconductor elements applied to such point of connection, whereby the function of an optical shift register is provided.

8. A switching device fabricated from two sets of switching devices each comprising a circuit including a two terminal switching semiconductor element having first and second terminals and having a negative resistance characteristic with a high impedance state and a low impedance state and light emission which increases with increasing current flowing therethrough, means for providing an impedance connected to said first terminal of such semiconductor element, a direct current power source coupled between said impedance means and said second terminal and forming a series circuit for supplying current to said semiconductor element in the forward sense, control means coupled to said series circuit for switching the state of said semiconductor element said control means including a photo-sensitive element connected in the forward sense to said direct current power source and means for feeding a photo control signal into said photo-sensitive element for switching said state of said semiconductor element and means for obtaining an output from said circuit indicative of the state of said semiconductor elements and together with a resistor inserted between the points where said semiconductor elements and said impedance means are connected, to thereby provide the function of a flip-flop circuit.

9. A switching device comprising a circuit including a two terminal switching semiconductor element having first and second terminals and having a negative resistance characteristic with a high impedance state and a low impedance state and light emission which increases with increasing current flowing therethrough, means for providing an impedance connected to said first terminal of such semiconductor element, a direct current power source coupled between said impedance means and said second terminal and forming a series circuit for supplying current to said semiconductor element in the forward sense, control means coupled to said series circuit for switching the state of said semiconductor element said control means including a photo-sensitive element connected in the forward sense to said direct current power source and means for feeding a photo control signal into said photo-sensitive element for switching said state of said semiconductor element and means for obtaining an output from said circuit indicative of the state of said semiconductor elements said two terminal switching semiconductor element being of four layer PNPN construction with three PN junctions, the outer PN junctions being biased in said forward sense and the intermediate PN junction being normally biased in a backward sense.

10. A device as in claim 9 where said control means causes a break down of said backward bias across said intermediate junction to permit a flow of high current through said element, said outer junctions emitting said light proportional to said high current flow.

* * * * *